United States Patent
Kim et al.

(10) Patent No.: US 11,118,019 B2
(45) Date of Patent: Sep. 14, 2021

(54) THERMOPLASTIC POLYURETHANE PARTICLES HAVING LOW IMPURITY CONTENT AND MANUFACTURING METHOD THEREFOR

(71) Applicant: LG Hausys, Ltd., Seoul (KR)

(72) Inventors: Min Gyung Kim, Seoul (KR); Sung Yong Kang, Seoul (KR); Kyoung Min Kang, Seoul (KR); Hee-Jung Lee, Seoul (KR); Chang-Young Park, Seoul (KR); Jae Ho Lim, Seoul (KR); Jun Ho Choi, Seoul (KR); Jae Han Song, Seoul (KR); Yu Jin Go, Seoul (KR)

(73) Assignee: LG Hausys, Ltd.

( * ) Notice: Subject to any disclaimer, the term of this patent is extended or adjusted under 35 U.S.C. 154(b) by 147 days.

(21) Appl. No.: 16/491,397

(22) PCT Filed: Mar. 9, 2018

(86) PCT No.: PCT/KR2018/002843
§ 371 (c)(1),
(2) Date: Sep. 5, 2019

(87) PCT Pub. No.: WO2018/164539
PCT Pub. Date: Sep. 13, 2018

(65) Prior Publication Data
US 2020/0032005 A1  Jan. 30, 2020

(30) Foreign Application Priority Data

Mar. 9, 2017  (KR) .................. 10-2017-0030178
Mar. 9, 2017  (KR) .................. 10-2017-0030179
(Continued)

(51) Int. Cl.
B32B 5/16  (2006.01)
C08J 3/12  (2006.01)
(Continued)

(52) U.S. Cl.
CPC . *C08J 3/12* (2013.01); *B01J 2/04* (2013.01); *B01J 2/20* (2013.01); *B29B 9/10* (2013.01);
(Continued)

(58) Field of Classification Search
CPC .......... C08J 3/12; C08J 2375/04; B29B 9/00; B29B 2009/125
See application file for complete search history.

(56) References Cited

U.S. PATENT DOCUMENTS 3,647,340 A   3/1972  Sakurai et al.
3,937,772 A   2/1976  Urban et al.
(Continued)

FOREIGN PATENT DOCUMENTS

DE  102007027543 A1  5/2008
EP     1707257 A2  10/2006
(Continued)

OTHER PUBLICATIONS

Machine translation copy of JP 2008-137377 (Year: 2008).*
(Continued)

*Primary Examiner* — Hoa (Holly) Le
(74) *Attorney, Agent, or Firm* — Lerner, David, Littenberg, Krumholz & Mentlik, LLP (57) ABSTRACT

The present invention provides thermoplastic polyurethane particles, which are formed in a continuous matrix phase from a thermoplastic polyurethane resin and have a particle diameter of 200-500 μm. In a differential scanning calorimetry (DSC) curve of the thermoplastic polyurethane particles, derived from the analysis of a temperature rise of 10° C./min by DSC, a peak of the cold crystallization temperature ($T_{cc}$) is shown at a temperature between the glass transition temperature ($T_g$) and the melting point ($T_m$). The thermoplastic polyurethane particles have a compression degree of 10-20%.

6 Claims, 3 Drawing Sheets

(30) Foreign Application Priority Data

Sep. 18, 2017 (KR) ........................ 10-2017-0119544
Mar. 8, 2018 (KR) ........................ 10-2018-0027628

(51) Int. Cl.

| | |
|---|---|
| C08L 67/04 | (2006.01) |
| C08G 63/06 | (2006.01) |
| B01J 2/20 | (2006.01) |
| B29B 9/10 | (2006.01) |
| B01J 2/04 | (2006.01) |
| B29B 9/12 | (2006.01) |
| B29K 67/00 | (2006.01) |

(52) U.S. Cl.

CPC .............. *C08G 63/06* (2013.01); *C08L 67/04* (2013.01); *B29B 2009/125* (2013.01); *B29K 2067/046* (2013.01); *C08J 2367/04* (2013.01); *C08J 2375/04* (2013.01); *C08L 2203/30* (2013.01)

(56) References Cited

U.S. PATENT DOCUMENTS

| | | | |
|---|---|---|---|
| 5,525,274 A * | 6/1996 | Grimmer | B01J 13/02 264/13 |
| 5,609,979 A | 3/1997 | Lawson | |
| 6,190,773 B1 | 2/2001 | Imamura et al. | |
| 6,527,995 B1 | 3/2003 | Kaufhold et al. | |
| 6,733,845 B1 | 5/2004 | Caramaro et al. | |
| 8,710,144 B2 | 4/2014 | Hesse et al. | |
| 2002/0099162 A1 | 7/2002 | Iwanaga et al. | |
| 2005/0142206 A1 | 6/2005 | Brown et al. | |
| 2005/0207931 A1 | 9/2005 | Hesse et al. | |
| 2006/0067895 A1 | 3/2006 | Miyamoto et al. | |
| 2006/0204604 A1 | 9/2006 | Yamanaka et al. | |
| 2006/0235188 A1 | 10/2006 | Weinhold et al. | |
| 2008/0026955 A1 | 1/2008 | Munoz et al. | |
| 2008/0103277 A1 | 5/2008 | Campbell et al. | |
| 2008/0122132 A1 * | 5/2008 | Kinoshita | B01J 2/20 264/12 |
| 2008/0152910 A1 | 6/2008 | Hesse et al. | |
| 2009/0280423 A1 | 11/2009 | Yahiro et al. | |
| 2010/0133717 A1 | 6/2010 | Boczon et al. | |
| 2010/0227985 A1 | 9/2010 | Nishiguchi et al. | |
| 2012/0270048 A1 | 10/2012 | Saigusa et al. | |
| 2013/0234350 A1 | 9/2013 | Osswald | |
| 2013/0289055 A1 | 10/2013 | Boit et al. | |
| 2013/0309497 A1 | 11/2013 | Takezaki et al. | |
| 2014/0024797 A1 * | 1/2014 | Nishiguchi | C08G 18/757 528/85 |
| 2015/0240021 A1 | 8/2015 | Hesse et al. | |
| 2016/0208057 A1 | 7/2016 | Baer et al. | |
| 2016/0208070 A1 | 7/2016 | Shin et al. | |
| 2017/0291996 A1 * | 10/2017 | Hwang | C08L 101/00 |
| 2018/0133685 A1 | 5/2018 | Lu et al. | |
| 2019/0276611 A1 | 9/2019 | Kuwagaki et al. | |
| 2020/0032005 A1 | 1/2020 | Kim et al. | |
| 2020/0032049 A1 | 1/2020 | Kang et al. | |
| 2020/0071470 A1 * | 3/2020 | Lim | C08J 3/12 |
| 2020/0316819 A1 | 10/2020 | Lee et al. | |

FOREIGN PATENT DOCUMENTS

| | | |
|---|---|---|
| EP | 1920825 A1 | 5/2008 |
| EP | 2732945 A1 | 5/2014 |
| EP | 3202824 A1 | 8/2017 |
| JP | S59226024 A | 12/1984 |
| JP | 2000007789 A | 1/2000 |
| JP | 2000052341 A | 2/2000 |
| JP | 2000313729 A | 11/2000 |
| JP | 2001288273 A | 10/2001 |
| JP | 2002283341 A | 10/2002 |
| JP | 2004269598 A | 9/2004 |
| JP | 2004269865 A | 9/2004 |
| JP | 2005097480 A | 4/2005 |
| JP | 2006002097 A | 1/2006 |
| JP | 2006124366 A | 5/2006 |
| JP | 2007535585 A | 12/2007 |
| JP | 2008070583 A | 3/2008 |
| JP | 2008137377 A | 6/2008 |
| JP | 2008163290 A | 7/2008 |
| JP | 2009029860 A | 2/2009 |
| JP | 2009035606 A | 2/2009 |
| JP | WO2009051104 A1 | 3/2011 |
| JP | 2012224809 A | 11/2012 |
| JP | 2014504305 A | 2/2014 |
| JP | 2014047304 A | 3/2014 |
| JP | 2016536412 A | 11/2016 |
| JP | 2016536420 A | 11/2016 |
| JP | 2018135493 A | 8/2018 |
| KR | 20000073060 A | 12/2000 |
| KR | 20010031742 A | 4/2001 |
| KR | 20010049784 A | 6/2001 |
| KR | 20070068490 A | 6/2007 |
| KR | 101292498 B1 | 8/2013 |
| KR | 20150117782 A | 10/2015 |
| KR | 20150126517 A | 11/2015 |
| WO | 2016052935 A1 | 4/2016 |
| WO | 2016052958 A1 | 4/2016 |

OTHER PUBLICATIONS

Machine translation copy of JP 2009-029860 (Year: 2009).*
Database WPI, Week 200020, Feb. 22, 2000 (Feb. 22, 2000), Thomson Scientific, London. GB; AN 2000-232139, XP002801299, 2 pages.
Database WPI, Week 201602, Nov. 12, 2015 (Nov. 12, 2015), Thomson Scientific, London, GB; AN 2015-71562P, XP002801284, 2 pages.
Database WPI, Week 201629, Apr. 7, 2016 (Apr. 7, 2016), Thomson Scientific, London, GB; AN 2016-20784P, XP002801283, 4 pages.
Extended European Search Report with Written Opinion for Application No. 18763304.5 dated Dec. 14, 2020, 14 pages.
Extended European Search Report with Written Opinion for Application No. 18763568.5 dated Dec. 11, 2020, 19 pages.
Anonymous, "Hot Cutting PP/PE Plastic Recycling Machine Air Cooled plastic granulator machine," Dec. 22, 2016, pp. 1-2, XP055744893.
Extended European Search Report with Written Opinion for Application No. 18764218.6 dated Nov. 20, 2020, 11 pages.
Vasanthavada et al, "Application of Melt Granulation Technology Using Twin-screw Extruder in Development of High-dose Modified-release Tablet Formulation", Journal of Pharmaceutical Sciences, May 23, 2011, pp. 1923-1934, vol. 100, No. 5, XP055128566.
International Search Report for Application No. PCT/KR2018/002843, dated Jul. 24, 2018, pp. 1-2.
International Search Report for Application No. PCT/KR2018/002845, dated Jul. 24, 2018, pp. 1-4.
International Search Report for PCT/KR2018/002846 dated Jul. 24, 2018.
International Search Report for PCT/KR2018/002848 dated Jun. 28, 2018.

* cited by examiner

THERMOPLASTIC POLYURETHANE PARTICLES HAVING LOW IMPURITY CONTENT AND MANUFACTURING METHOD THEREFOR

CROSS-REFERENCE TO RELATED APPLICATIONS

This application is a national phase entry under 35 U.S.C. § 371 of International Application No. PCT/KR2018/002843, filed Mar. 9, 2018, which claims priorities based on Korean Patent Application Nos. 10-2017-0030178 and 10-2017-0030179, filed on Mar. 9, 2017, Korean Patent Application No. 10-2017-0119544, filed on Sep. 18, 2017, and Korean Patent Application No. 10-2018-0027628, filed on Mar. 8, 2018, the entire contents of which are incorporated herein by reference.

TECHNICAL FIELD

The present invention relates to thermoplastic polyurethane particles and a manufacturing method therefor, more specifically to thermoplastic polyurethane particles having a particle diameter of 200 to 500 μm and a manufacturing method therefor.

BACKGROUND ART

The thermoplastic polyurethane particle is utilized in a variety of industries such as cosmetics, fillers in paints and coatings, hot melt adhesives, thermal molded articles and polymeric toners. In particular, the thermoplastic polyurethane particles may be applied to the instrument panel (IP) or door trim skin among automotive interior materials. The instrument panel or door trim skin is manufactured through a powder slush molding (PSM) process.

The powder slush molding process consists of the following four steps. In the first step, the powder box is filled with particles and then the mold which had the desired three-dimensional shape and was heated to 200 to 300° C. is fastened. In the second step, the skin is formed by rotating the powder box to allow the particles to stick to the mold and then to melt. In the third step, the mold is demolded and cooled in the powder box. In the fourth step, the polyurethane skin formed from the mold is taken out.

In order to properly utilize thermoplastic polyurethane particles in the powder slush molding process, particle characteristics such as suitable particle diameter are basically required. In particular, the second step of the powder slush molding process is an important step in which the quality of the molded article is determined. In this second step, the better the particles are compacted and the better flowability in the particle state is, the less pin-holes are generated, which can result in a higher quality of the molded article.

As a manufacturing method of thermoplastic polyurethane particles, there are a crushing method represented by a freeze-crushing method; a solvent dissolution-precipitation method which makes it precipitate by dissolving in a high temperature solvent and then cooling or which makes it precipitate by dissolving in a solvent and then adding a bad solvent; a melt kneading method which obtains thermoplastic resin particles by mixing the thermoplastic resin and the incompatible resin in the mixer to form a composition containing the thermoplastic resin in the dispersed phase and the thermoplastic resin and the incompatible resin in the continuous phase, and then removing the incompatible resin; and the like.

If the particles are manufactured by the crushing method, there is a problem that it is difficult to secure the particles uniformity of the manufactured thermoplastic polyurethane particles. In addition, the crushing method requires a high cost compared to the particle obtaining process because liquid nitrogen is used during cooling, and if a compounding process for adding pigments, antioxidants, etc. to the raw material of the thermoplastic polyurethane resin is added, since the process proceeds batchwise, the productivity is low as compared to that of the continuous particle obtaining process. If the particles are manufactured by the solvent dissolution precipitation method and the melt kneading method, there is a problem that in addition to the thermoplastic resin particles, other components such as a solvent may be detected as impurities. Due to the above-described problems, when manufacturing the thermoplastic polyurethane particles by the conventional methods, it is not possible to manufacture thermoplastic polyurethane particles having suitable physical properties that can be utilized in a powder slush molding process or the like.

Accordingly, there is a need in the art for thermoplastic polyurethane particles having improved particle characteristics to be suitable for the powder slush molding process.

PRIOR ART DOCUMENT

[Patent Document]
(Patent Document 1) Japanese Laid-open Patent Publication No. 2001-288273
(Patent Document 2) Japanese Laid-open Patent Publication No. 2000-007789
(Patent Document 3) Japanese Laid-open Patent Publication No. 2004-269865

DISCLOSURE

Technical Problem

The present invention is to provide thermoplastic polyurethane particles having physical properties suitable for use in a powder slush molding process and the like, which effectively prevent the incorporation of impurities other than the resin component in the particles by extruding a thermoplastic polyurethane resin, granulating the extruded resin by contact with air, and cooling it to manufacture thermoplastic polyurethane particles, and which could not be obtained by conventional methods.

Technical Solution

According to the first aspect of the invention, the present invention provides a thermoplastic polyurethane resin formed as a continuous matrix phase from a thermoplastic polyurethane resin and having a particle diameter of 200 to 500 μm.

In one embodiment of the present invention, the thermoplastic polyurethane particles have a peak of cold crystallization temperature ($T_{cc}$) at a temperature between the glass transition temperature ($T_g$) and the melting point ($T_m$) in the differential scanning calorimetry (DSC) curve derived from temperature rise analysis of 10° C./min by the DSC.

In one embodiment of the present invention, the thermoplastic polyurethane particles have an aspect ratio of 1.00 or more and less than 1.05, and a roundness of 0.95 to 1.00.

In one embodiment of the present invention, the thermoplastic polyurethane particles have a compression degree of 10 to 20%.

According to a second aspect of the invention, the present invention provides a method for manufacturing thermoplastic polyurethane particles comprising supplying a thermoplastic polyurethane resin to an extruder and extruding it; supplying the extruded thermoplastic polyurethane resin and air to the nozzle, bringing the thermoplastic polyurethane resin into contact with air to granulate the thermoplastic polyurethane resin, and then discharging the granulated thermoplastic polyurethane resin; and supplying the discharged thermoplastic polyurethane particles to a cooling unit to cool the thermoplastic polyurethane particles, and then collecting cooled thermoplastic polyurethane particles.

Advantageous Effects

The thermoplastic polyurethane particles according to the present invention are manufactured by granulating the thermoplastic polyurethane resin by contact with air after extrusion and thus basically do not have impurities such as a solvent in the particles. In addition, the particles of the present invention have a large diameter of 200 to 500 μm and shows a uniform particle distribution, and has a high compression degree of 10 to 20%.

If the thermoplastic polyurethane particles having the above physical properties are utilized in a powder slush molding process and the like, the quality of the molded article can be improved by minimizing the occurrence of defective products.

BEST MODE

Embodiments provided according to the present invention can all be achieved by the following description. It is to be understood that the following description describes preferred embodiments of the invention, and the invention is not necessarily limited thereto.

In the following specification, for the numerical range, the expression "to" is used to include both the upper and lower limits of the range, and when not including the upper limit or the lower limit, the expression "less than", "more than", "no more than", or "no less than" is used in order to specifically indicate whether or not to include the upper limit or the lower limit.

The present invention provides thermoplastic polyurethane particles having physical properties suitable for use in a powder slush molding process and the like, which could not be obtained by conventional particle manufacturing methods. Hereinafter, the thermoplastic polyurethane particles according to the present invention will be described in detail.

Thermoplastic Polyurethane Particles

The present invention provides thermoplastic polyurethane particles manufactured by granulating a thermoplastic polyurethane resin by contact with air after extrusion. The manufacturing method of thermoplastic polyurethane particles according to the present invention is an improved method as compared to the conventional crushing method, solvent dissolution precipitation method, and melt kneading method, and the specific manufacturing method will be described in the section "Manufacturing method of thermoplastic polyurethane particles" below.

The thermoplastic polyurethane particles according to the present invention have a particle diameter of 200 to 500 μm. In the case of thermoplastic polyurethane particles having a particle diameter of less than 200 μm or more than 500 μm, the thermoplastic polyurethane particles are generally not applicable in the powder slush molding process because the particle diameter acts as a factor to hinder the flow of particles during sheet molding of the powder slush molding. The particle diameter of the above-mentioned size corresponds to the larger particle diameter compared to the general particulate. The larger the particle diameter is, the more difficult it is to control the shape of the particle in the manufacturing process. However, in the present invention, it is easy to control the shape of the particles in the manufacturing process. Therefore, even though the particles have a large particle diameter, the roundness is high, and the particle size distribution is also formed relatively uniformly.

In the present invention, the shape of the particles is evaluated by the following aspect ratio and roundness. The closer the aspect ratio and roundness is to 1, the closer the shape of the particle is to the sphere. The aspect ratio is calculated by the following Formula 1.

$$\text{Aspect ratio} = \text{major axis}/\text{minor axis}. \quad \text{[Formula 1]}$$

In addition, the roundness is calculated by the following Formula 2.

$$\text{Roundness} = 4 \times \text{area}/(\pi \times \text{major axis}^2). \quad \text{[Formula 2]}$$

Figure 1:
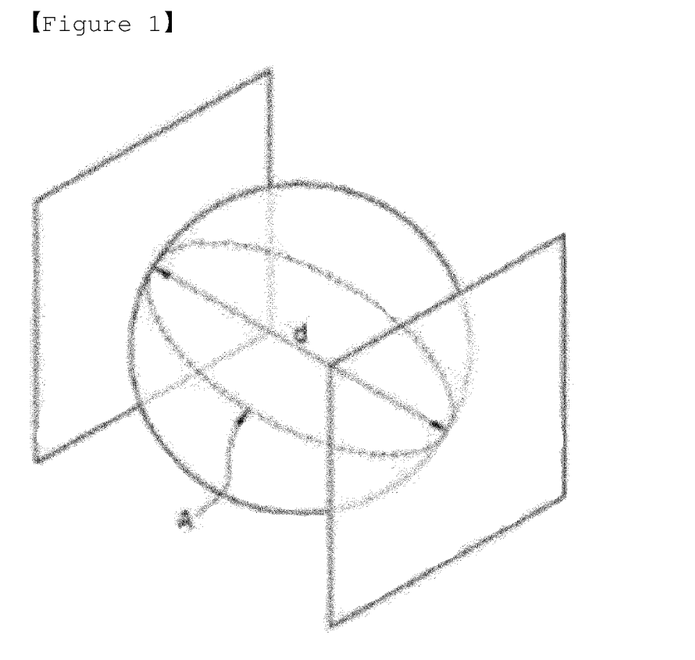
FIG. 1 is an image schematically showing the shape of a thermoplastic polyurethane particle of the present invention.

In order to explain the Formulas in detail, FIG. 1 is provided which schematically illustrates a thermoplastic polyurethane particle. According to FIG. 1, in Formulas 1 and 2, the "major axis" means the longest distance among the vertical distances (d) between two parallel tangent lines of the 2D image (cross-section) of the thermoplastic polyurethane particle, and the "minor axis" means the shortest distance among the vertical distances (d) between two parallel tangent lines of the 2D image (cross-section) of the thermoplastic polyurethane particle. In addition, in Formula 2, the "area" means the area of the cross section including the major axis of the thermoplastic polyurethane particle. FIG. 1 illustrates an area (A) as an example when the vertical distance (d) between two parallel tangent planes of the thermoplastic polyurethane particles is a major axis.

According to one embodiment of the present invention, the thermoplastic polyurethane particles according to the present invention may have an aspect ratio of 1.00 or more and less than 1.05, more specifically 1.02 or more and less than 1.05, and may have a roundness of 0.95 to 1.00, more specifically 0.98 to 1.00. If the shape of the thermoplastic polyurethane particles satisfies the above-described aspect ratio and roundness ranges, the flowability and uniformity of the thermoplastic polyurethane particles are increased, so that the particles are easily handled when applied to the powder slush molding process, products made through the powder slush molding process using the particles described above also have improved quality by suppressing defects such as internal voids.

The numerical values according to Formulas 1 and 2 can be measured by image-processing an image of thermoplastic polyurethane particles using ImageJ (National Institutes of Health (NIH)), and converting them into a binary image and then digitizing the degree of spherical shape of individual particles.

The thermoplastic polyurethane particles according to the present invention are particles formed as a continuous matrix phase from the thermoplastic polyurethane resin. Forming as a continuous matrix phase from the thermoplastic polyurethane resin means that the thermoplastic polyurethane resin forms a continuous dense structure without additional components. By extruding the thermoplastic polyurethane resin, melting it and granulating the melt with air, thermoplastic polyurethane particles are produced continuously with a dense structure. In contrast, according to the conventional manufacturing method, since particles are formed by adding additional components or particles are formed through a discontinuous process of cooling and crushing, the particles are not formed as a continuous matrix phase.

The particles formed as a continuous matrix phase from thermoplastic polyurethane resins have a high purity because they do not contain impurities during the manufacture of the particles. Here, "impurity" means a component other than thermoplastic polyurethane, which may be incorporated in the manufacture of the particles. Exemplary impurities are a solvent for dispersing the thermoplastic polyurethane resin, heavy metal components included in the grinding or grinding process, unreacted monomers included in the polymerization process, and the like. According to one embodiment of the present invention, the impurity content of the thermoplastic polyurethane particles of the present invention may be 50 ppm or less, preferably 20 ppm or less, more preferably 5 ppm or less.

In addition, the particles may additionally have other properties as well as purity. As one of these properties, the thermoplastic polyurethane particles have a peak of cold crystallization temperature ($T_{cc}$) at a temperature between the glass transition temperature ($T_g$) and the melting point ($T_m$) in the differential scanning calorimetry (DSC) curve derived from temperature rise analysis of 10° C./min by the DSC. The thermoplastic polyurethane particles are spherical solid particles at room temperature. When these particles are subjected to temperature rise analysis using differential scanning calorimetry, the thermoplastic polyurethane particles have a peak of cold crystallization temperature ($T_{cc}$) at a temperature between the glass transition temperature ($T_g$) and the melting point ($T_m$), which means that the thermoplastic polyurethane particles have a property of generating heat before melting. In the present specification, the peak of cold crystallization temperature ($T_{cc}$) refers to only the peak of cold crystallization temperature ($T_{cc}$) that appears when the temperature rise analysis is performed on the thermoplastic polymer particles for the first time, and thereafter, the peak of the cold crystallization temperature ($T_{cc}$), which may occur as the internal structure of the particle is modified by repetitive temperature rise, is not included in the characteristics of the particles described herein. If the peak of cold crystallization temperature ($T_{cc}$) is caused by repetitive temperature rise, since energy for repetitive temperature rise is consumed, and thus it does not have an advantage in terms of energy when processing the particles. According to one embodiment of the present invention, the cold crystallization temperature ($T_{cc}$) is shown in a 30% to 70% section between the glass transition temperature ($T_g$) and the melting point ($T_m$). In this section, 0% is the glass transition temperature ($T_g$) and 100% is the melting point ($T_m$). In addition, according to the DSC curve, the thermoplastic polymer particles may have a difference ($\Delta H1-\Delta H2$) of 3 to 100 J/g between an endothermic amount ($\Delta H1$) and an exothermic amount ($\Delta H2$). By these features, when performing the powder slush molding process using the thermoplastic polyurethane particles, it is possible to obtain an advantage that can be processed at a low temperature as compared to the processing temperature of conventional homogeneous thermoplastic polyurethane particles.

The thermoplastic polyurethane particles of the present invention have a higher compression degree as compared to the conventional thermoplastic polyurethane particles. The compression degree may be calculated by Formula 3 below. According to one embodiment of the present invention, the thermoplastic polyurethane particles have a compression degree of 10 to 20%.

$$\text{Compression degree} = (P-A)/P \times 100 \qquad \text{[Formula 3]}$$

wherein P means compressed bulk density and A means relaxed bulk density.

As described above, the thermoplastic polyurethane particles according to the present invention can fill the voids between the particles well because of the good flowability, thereby maintaining a higher compression degree than the thermoplastic polyurethane particles manufactured by other manufacturing methods. The compression degree of the thermoplastic polyurethane particles may affect the quality of the molded article during the manufacture of the molded article through the particles. In the case of using thermoplastic polyurethane particles having a degree of compression above a certain degree of compression as in the present invention, the occurrence of pin-holes in the molded article is reduced, thereby improving the quality of the molded article. According to one embodiment of the present invention, the thermoplastic polyurethane particles have a compressed bulk density of 0.45 to 0.5 g/cm$^3$. The compressed bulk density has a lower numerical value than thermoplastic polyurethane particles manufactured by other manufacturing methods. The reason is that thermoplastic polyurethane particles according to the present invention having high sphericity and uniform particle diameter distribution may have a certain size of voids between the particles even after compression.

The thermoplastic polyurethane particles according to the present invention have a flow time of 10 to 20 seconds. The flow time is a numerical value representing the fluidity of the powder. The short flow time means that the frictional resistance between particles is small. If the frictional resistance between particles is small, it is easy to handle the particles. Since the thermoplastic polyurethane particles according to the present invention can maintain an excellent level in terms of flow time, it is easy to handle the particles in applying the particles.

The thermoplastic polyurethane particles having the above-mentioned characteristics are manufactured by the following manufacturing method. Hereinafter, a manufacturing method of the thermoplastic polyurethane particles according to the present invention will be described in detail.

Manufacturing Method of Thermoplastic Polyurethane Particles

Figure 2:
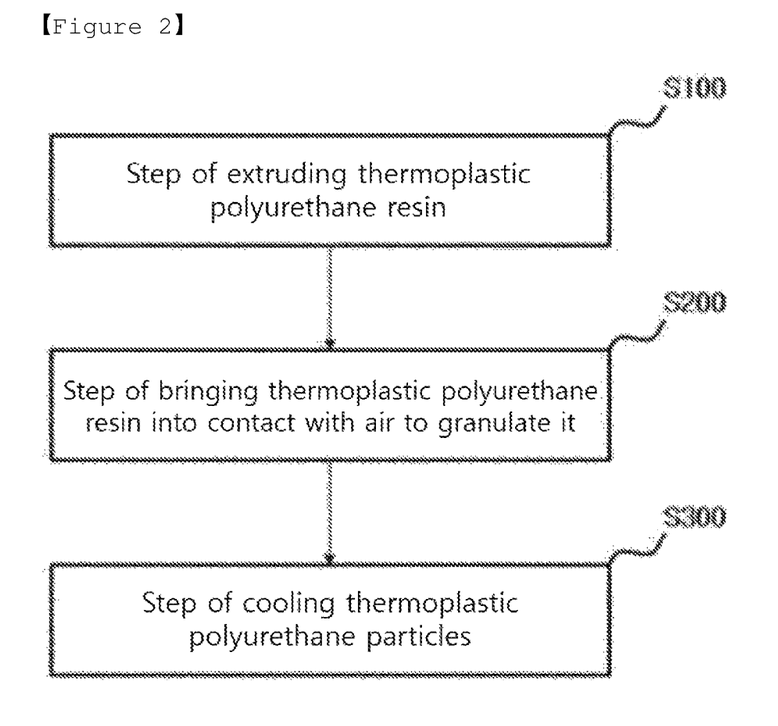
FIG. 2 is a process flow chart schematically showing a method for manufacturing thermoplastic polyurethane particles according to the present invention.

FIG. 2 schematically illustrates a process flow diagram for the manufacturing method. The manufacturing method comprises supplying a thermoplastic polyurethane resin to an extruder and extruding it (S100); supplying the extruded thermoplastic polyurethane resin and air to the nozzle, bringing the thermoplastic polyurethane resin into contact with air to granulate the thermoplastic polyurethane resin, and then discharging the granulated thermoplastic polyurethane resins (S200); and supplying the discharged thermoplastic polyurethane particles to a cooling unit to cool the thermoplastic polyurethane particles, and then collecting cooled thermoplastic polyurethane particles (S300). Hereinafter, each step of the manufacturing method will be described in detail.

In order to manufacture thermoplastic polyurethane particles according to the present invention, first, a thermoplastic polyurethane resin as a raw material is supplied to an extruder and extruded. By extruding the thermoplastic polyurethane resin, the thermoplastic polyurethane resin has physical properties suitable for processing particles in the nozzle. The thermoplastic polyurethane resin used as a raw material may preferably have a weight average molecular weight (Mw) of 10,000 to 200,000 g/mol in consideration of appropriate physical properties of the prepared particles.

The extruder supplied with the thermoplastic polyurethane resin controls physical properties such as the viscosity of the thermoplastic polyurethane resin by heating and pressing the thermoplastic polyurethane resin. The type of extruder is not particularly limited as long as it can adjusted to have physical properties suitable for granulation at the nozzle. According to one embodiment of the present invention, the extruder may be a twin-screw extruder for efficient extrusion. The inside of the extruder may be preferably maintained at 150 to 300° C., preferably 170 to 270° C., more preferably 200 to 250° C. If the internal temperature of the extruder is less than 150° C., the viscosity of the thermoplastic polyurethane resin is high, which is not suitable for granulation at the nozzle, and also the thermoplastic polyurethane resin has low flowability in the extruder, thereby being not efficient for extrusion. In addition, if the internal temperature of the extruder is higher than 300° C., the flowability of the thermoplastic polyurethane resin is high, and thus efficient extrusion is possible, but if the thermoplastic polyurethane resin is granulated in the nozzle, it is difficult to control fine physical properties.

The extrusion amount of the thermoplastic polyurethane resin may be set to facilitate the physical properties of the thermoplastic polyurethane resin in consideration of the size of the extruder. According to one embodiment of the present invention, the thermoplastic polyurethane resin is extruded at a rate of 1 to 10 kg/hr. The viscosity of the extruded thermoplastic polyurethane resin may be 0.5 to 20 Pa·s, preferably 1 to 15 Pa·s, more preferably 2 to 10 Pa·s. If the viscosity of the thermoplastic polyurethane resin is less than 0.5 Pa·s, it is difficult to process the particles at the nozzle. If the viscosity of the thermoplastic polyurethane resin is more than 20 Pa·s, the flowability of the thermoplastic polyurethane resin at the nozzle is low, and thus the processing efficiency is lowered. The temperature of the extruded thermoplastic polyurethane resin may be 150 to 250° C.

The extruded thermoplastic polyurethane resin is supplied to the nozzle in the extruder. Along with the thermoplastic polyurethane resin, air is also supplied to the nozzle. The air contacts the thermoplastic polyurethane resin in the nozzle to granulate the thermoplastic polyurethane resin. Hot air is supplied to the nozzle to properly maintain the physical properties of the thermoplastic polyurethane resin. According to one embodiment of the present invention, the temperature of the air may be 250 to 450° C., preferably 260 to 400° C., more preferably 270 to 350° C. If the temperature of the air is less than 250° C. or more than 450° C., when the thermoplastic polyurethane particles are manufactured produced from the thermoplastic polyurethane resin, the physical properties of the surface in contact with air may be changed in an undesirable direction, which causes a problem. In particular, when the temperature of the air exceeds 450° C., excessive heat is supplied to the contact surface with the air, the decomposition phenomenon of the thermoplastic polyurethane may occur on the surface of the particles.

Figure 3:
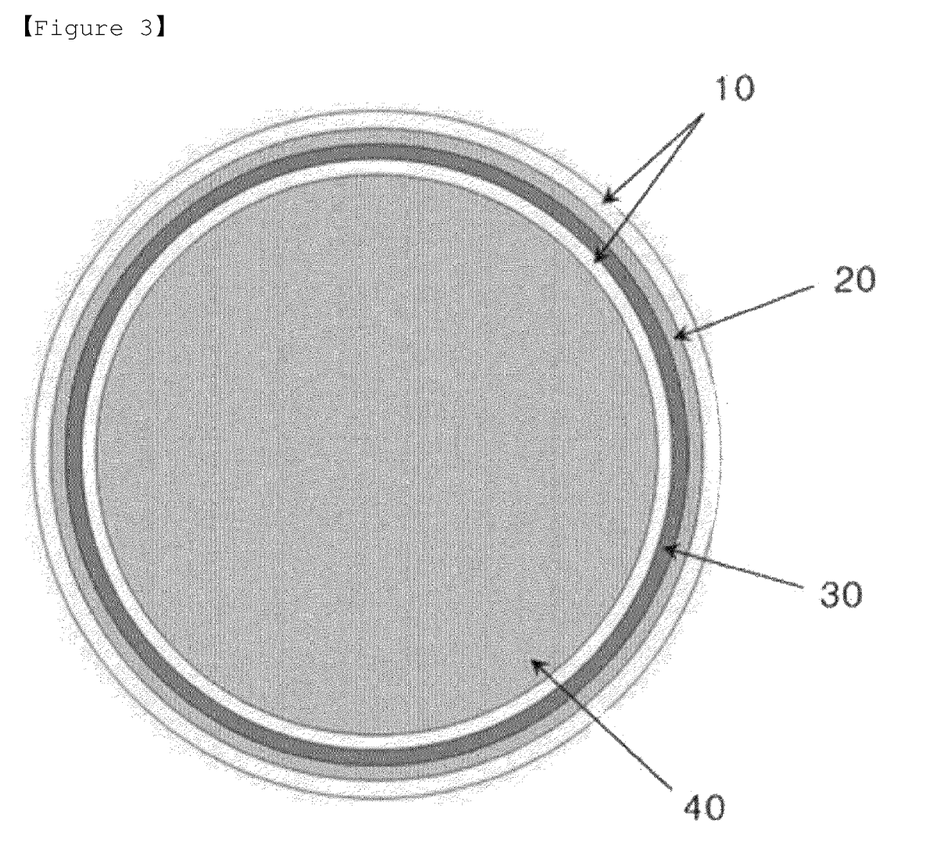
FIG. 3 is a cross-sectional view of a nozzle outlet showing a supply position of a thermoplastic polyurethane resin and air to a nozzle according to an embodiment of the present invention.

The supply position of the thermoplastic polyurethane resin and the air supplied to the nozzle is set such that the thermoplastic polyurethane particles can have an appropriate size and shape, and the formed particles can be evenly dispersed. FIG. 3 shows a cross-sectional view of the nozzle outlet, and the supply position of the thermoplastic polyurethane resin and air according to an embodiment of the present invention will be described in detail with reference to FIG. 3. For the detailed description herein, the positions of the nozzles are expressed as "inlet", "outlet", and "distal end". The "inlet" of the nozzle means the position where the nozzle starts, and the "outlet" of the nozzle means the position where the nozzle ends. In addition, the "distal end" of the nozzle means the position from two thirds of the nozzle to the outlet. Here, point 0 of the nozzle is the inlet of the nozzle and point 1 of the nozzle is the outlet of the nozzle.

As shown in FIG. 3, the cross-section perpendicular to the flow direction of thermoplastic polyurethane resin and air is a circle. The air is supplied through a first air stream(40) fed into the center of the circle and a second air stream(20) fed into the outer portion of the circle, and the thermoplastic polyurethane resin is supplied between the first air stream (40) and the second air stream(20). From the time the thermoplastic polyurethane resin and the air are supplied to the inlet of the nozzle to just before the outlet of the nozzle, each feed stream (the thermoplastic polyurethane resin stream(30), the first air stream(40) and the second air stream(20)) is separated by the internal structure of the nozzle. Just before the outlet of the nozzle, the thermoplastic polyurethane resin stream and the second air stream are merged to bring the thermoplastic polyurethane resin into contact with air, thereby granulating the thermoplastic polyurethane resin. In contrast, the first air stream is separated by the internal structure of the nozzle from the thermoplastic polyurethane resin stream and the second air stream until the air and the thermoplastic polyurethane resin are discharged from the nozzle. The first air stream serves to prevent the particles of the thermoplastic polyurethane resin granulated by the second air stream from adhering to the outlet of the nozzle and evenly disperse the discharged particles after discharging from the nozzle and before feeding to the cooling unit.

The extruded thermoplastic polyurethane resin in the extruder is all supplied to the above-mentioned position of the nozzle, the flow rate of air supplied to the nozzle can be adjusted depending on the flow rate of the extruded thermoplastic polyurethane resin. According to one embodiment of the present invention, the air is supplied to the nozzle at a flow rate of 1 to 300 m³/hr, preferably 30 to 240 m³/hr, more preferably 60 to 180 m³/hr. The air is supplied separately into the first air stream and the second air stream within the flow rate range of the air. As described above, the thermoplastic polyurethane resin is granulated by the second air stream. The ratio of the thermoplastic polyurethane resin and the second air stream as well as the temperature of the second air stream may determine the physical properties of the particles. According to one embodiment of the present invention, the ratio of the cross-sectional areas of the thermoplastic polyurethane resin and the second air stream based on the cross section of the outlet of the nozzle may be 2:1 to 4:1, preferably 2.5:1 to 3.5:1. If the ratio of the thermoplastic polyurethane resin and the second air stream is controlled within the above range, thermoplastic polyurethane particles having a suitable size and shape that have high utility for a powder slush molding process can be manufactured.

Since the thermoplastic polyurethane resin is granulated at the nozzle, the inside of the nozzle is controlled to a temperature suitable for granulating the thermoplastic polyurethane resin. Since a sharp rise in temperature can change the structure of the thermoplastic polyurethane, the temperature from the extruder to the outlet of the nozzle can be raised step by step. Therefore, the internal temperature of the nozzle is set on average to a range higher than the internal temperature of the extruder. Since the distal end temperature of the nozzle is defined separately below, the internal temperature of the nozzle herein means the average temperature of the rest of the nozzle except for the distal end of the nozzle unless otherwise specified. According to one embodiment of the present invention, the inside of the nozzle may be maintained at 250 to 350° C. If the internal temperature of the nozzle is less than 250° C., sufficient heat is not transferred to the thermoplastic polyurethane resin to satisfy the physical properties. If the internal temperature of the nozzle is above 350° C., excessive heat can be supplied to the thermoplastic polyurethane resin, thereby changing the structure of the thermoplastic polyurethane.

The distal end of the nozzle may be maintained at a temperature higher than the average temperature inside the nozzle to improve the external and internal physical properties of the resulting particles. The distal end temperature of the nozzle may be determined between the glass transition temperature ($T_g$) and the pyrolysis temperature ($T_d$) of the thermoplastic polyurethane, and specifically may be determined according to Formula 4 below:

Distal end temperature=glass transition temperature ($T_g$)+(pyrolysis temperature ($T_d$)−glass transition temperature ($T_g$))×A, [Formula 4]

wherein A may be 0.5 to 1.5, preferably 0.65 to 1.35, more preferably 0.8 to 1.2. If A is less than 0.5, it is difficult to expect the improvement of the external and internal physical properties of the particles according to the temperature rise at the distal end of the nozzle. If A is greater than 1.5, the heat substantially transmitted to the thermoplastic polyurethane at the distal end of the nozzle may be excessively increased, thereby deforming the structure of the thermoplastic polyurethane. The glass transition temperature and pyrolysis temperature may vary depending on the type, degree of polymerization, structure, and the like of the polymer. According to one embodiment of the present invention, the thermoplastic polyurethane of the present invention may be a thermoplastic polyurethane having a glass transition temperature of −40 to −20° C. and a pyrolysis temperature of 250 to 350° C. Since the distal end of the nozzle is kept higher than the average temperature of the nozzle, in some cases, the distal end of the nozzle may be provided with additional heating means.

The discharged thermoplastic polyurethane particles at the nozzle are fed to the cooling unit. The nozzle and the cooling unit can be spaced apart from each other, in which case the discharged thermoplastic polyurethane particles are primarily cooled by ambient air before being supplied to the cooling unit. the hot air as well as the thermoplastic polyurethane particles are discharged together from the nozzle. By separating the nozzle and the cooling unit, the hot air can be discharged to the outside instead of the cooling unit, thereby increasing the cooling efficiency in the cooling unit. According to one embodiment of the present invention, the cooling unit is located spaced apart from the nozzle at a distance of 100 to 500 mm, preferably 150 to 400 mm, more preferably 200 to 300 mm. If the separation distance is shorter than the distance, a large amount of hot air is injected into the cooling chamber, thereby lowering the cooling efficiency. If the separation distance is longer than the distance, the amount cooled by the ambient air is increased, the rapid cooling by the cooling chamber is not achieved. In addition, the injection angle when discharging the thermoplastic polyurethane particles in the nozzle may be 10 to 60°. When discharging thermoplastic polyurethane particles at a corresponding angle, the effect of the separation between the nozzle and the cooling unit can be doubled.

The cooling unit cools the thermoplastic polyurethane particles by supplying low temperature air into the cooling unit to bring the thermoplastic polyurethane particles into contact with air. The low temperature air forms a rotary airflow in the cooling unit, and the rotational airflow can sufficiently secure the retention time of the thermoplastic polyurethane particles in the cooling unit. The flow rate of air supplied to the cooling unit may be adjusted depending on the supply amount of thermoplastic polyurethane particles. According to one embodiment of the present invention, the air may be supplied to the cooling unit at a flow rate of 1 to 10 m$^3$/min. The air may preferably have a temperature of −30 to −20° C. By supplying cryogenic air into the cooling unit in comparison with the thermoplastic polyurethane particles supplied to the cooling unit, the thermoplastic polyurethane particles are rapidly cooled to properly maintain the internal structure of the high temperature thermoplastic polyurethane particles during discharging. The thermoplastic polyurethane particles are reheated again when actually applied for the manufacture of the product. At this time, the reheated thermoplastic polyurethane has physical properties that are advantageous for processing. The thermoplastic polyurethane particles cooled by low temperature air are cooled to 40° C. or less and discharged. The discharged particles are collected through a cyclone or a bag filter.

Hereinafter, preferred examples are provided to aid the understanding of the present invention. However, the following examples are provided only to more easily understand the present invention, but the present invention is not limited thereto.

EXAMPLES

Example 1: Manufacture of Thermoplastic Polyurethane Particles According to the Manufacturing Method of the Present Invention 100 wt. % of thermoplastic polyurethane resin (Lubrizol, Pearlthane™ D91M80, Mw: about 160,000 g/mol, glass transition temperature ($T_g$): about −37° C., pyrolysis temperature ($T_d$): about 290° C.) was fed to a twin-screw extruder (diameter (D)=32 mm, length/diameter (L/D)=40). The twin-screw extruder was set to a temperature condition of about 220° C. and an extrusion amount condition of about 5 kg/hr, and then proceeded with extrusion. The extruded thermoplastic polyurethane resin has a viscosity of about 5 Pa·s. The extruded thermoplastic polyurethane resin was supplied to a nozzle set to the internal temperature of about 300° C. and the distal end temperature of about 350° C. (A value according to Formula 4 is about 1.18). In addition, air of about 350° C. was supplied to the nozzle at a flow rate of about 1 m³/min. The air was supplied to the central portion and the outer portion of the cross section of the nozzle, and the extruded thermoplastic polyurethane resin was supplied between the central portion and the outer portion of the nozzle to which the air is supplied. The ratio of the cross-sectional areas of the air supplied to the outer portion and the extruded thermoplastic polyurethane supplied between the central portion and the outer portion to which the air is supplied was about 2.9:1. The thermoplastic polyurethane resin supplied to the nozzle was granulated by contact with hot air, and the granulated particles were ejected from the nozzle. The ejection angle from the nozzle was about 45° and the ejected particles were fed to a cooling chamber (diameter (D)=1,100 mm, length (L)=3,500 mm) spaced at a distance of about 200 mm from the nozzle. In addition, the cooling chamber was controlled to form a rotary airflow by injecting air at −25° C. at a flow rate of about 6 m³/min before the ejected particles are supplied. Particles sufficiently cooled down to 40° C. in the cooling chamber were collected through a cyclone or a bag filter.

Comparative Example 1: Manufacture of Thermoplastic Polyurethane Particles by Freeze Crushing Method The same thermoplastic polyurethane resin as in Example 1 was supplied to a screw feeder through a hopper. After removing the moisture while moving the raw material through the screw, the raw material was introduced into a crusher supplied with liquid nitrogen of −130° C. The crusher was a Pin Crusher-type crusher. Particle size was controlled via a crushing size determination pin. The particles granulated through the crusher were collected through a cyclone.

Experimental Example 1: Evaluation of Physical Properties of Particles

The physical properties of the particles manufactured according to Example 1 and Comparative Example 1 were measured and shown in Table 1 below.

TABLE 1

| | Average particle diameter (μm)[1] | Aspect ratio[2] | Roundness[3] | Relaxed bulk density[4] (g/cm³) | Compressed bulk density[5] (g/cm³) | Compression degree[6] (%) | Flow time[7] (s) |
|---|---|---|---|---|---|---|---|
| Example 1 | 410.3 | 1.02 ± 0.01 | 0.99 ± 0.01 | 0.418 | 0.487 | 14 | 14 |
| Comparative Example 1 | 408.5 | 1.44 ± 0.34 | 0.71 ± 0.21 | 0.491 | 0.526 | 6.7 | 19 |

[1]The average particle diameter of the powder, which is an aggregate of particles, was derived using ImageJ (National Institutes of Health (NIH)) at room temperature. The major axis of each particle is the particle diameter. For the aggregate of particles, the number average value of each particle diameter is the average particle diameter.
[2]and [3]The formation of particles was analyzed by image-processing using the same device, and converting into a binary image and then digitizing the degree of spherical shape of individual particles, and the aspect ratio and roundness were derived by Formulas 1 and 2.
[4]Relaxed bulk density: The mass per unit volume is calculated by measuring the mass when the 100 ml cylinder is filled with particles silently (average value of 5 repeated measurements).
[5]Compressed bulk density: The mass per unit volume is calculated by measuring the mass after the arbitrary compression by tapping the cylinder filled with particles by the above [1]with a constant force 10 times (average value of 5 repeated measurements).
[6]Compression degree (%) = (P − A)/P × 100, P: compressed bulk density of the particles, A: relaxed bulk density of the particles.
[7]Flow time: After filling a 100 ml cylinder with the particles and then pouring into the funnel of the device for measuring apparent specific gravity of KS M 3002, the time it takes for the sample to exit completely by opening the exit is measured (average value of 5 repeated measurements).
According to Table 1, the particles of Example 1 have a uniform particle distribution while having the larger particle diameter as compared to the particles of Comparative Example 1. In addition, the particles of Example 1 have a high roundness compared to the particles of Comparative Example 1, thereby ensuring a constant space during compression and thus having a low compressed bulk density. The particles of Example 1 have a high compression degree while having a low compressed bulk density, thereby minimizing the generation of pin-holes when the particles are applied to the product. In addition, the particles of Example 1 are easy to handle and process the particles because of their high fluidity, as can be seen through a short flow time.

Experimental Example 2: DSC Analysis

The particles prepared according to Example 1 and Comparative Example 1 were DSC analyzed, and the results are shown in Table 2 below. Specifically, DSC curves were obtained by increasing the temperature from 0° C. to 200° C. under the rate of temperature rise of 10° C./min using differential scanning calorimetry (DSC, Perkin-Elmer, DSC8000). The glass transition temperature (Tg), the melting point (Tm), cold crystallization temperature (Tcc), and the difference between an endothermic amount (ΔH1) and an exothermic amount (ΔH2) were derived from each DSC curve.

TABLE 2

| | $T_g$ (° C.) | $T_m$ (° C.) | $T_{cc}$ (° C.) | ΔH1 − ΔH2 (J/g) |
|---|---|---|---|---|
| Example 1 | −37 | 136 | 36 | 5.5 |
| Comparative Example 1 | −34 | 140 | — | 10 |

It was confirmed that the thermoplastic polyurethane particles of Example 1 show a peak of the cold crystallization temperature at 36° C., whereas the thermoplastic polyurethane particles of Comparative Example 1 do not show a peak of such cold crystallization temperature. Furthermore, it was confirmed that in the case of Example 1, the difference between the endothermic amount (ΔH1) and the exothermic amount (ΔH2) is about 5.5 J/g, whereas in the case of Comparative Example 1, the difference between the endothermic amount (ΔH1) and the exothermic amount (ΔH2) is about 10 J/g. It is understood that the thermoplastic polyurethane particles of Example 1 have a relatively high exothermic amount because they have a property of generating heat before the particles are melted by the cold crystallization phenomenon.

If the thermoplastic polyurethane particles have a peak of cold crystallization temperature as in Example 1, when performing the powder slush molding process using such particles, such particles may have an advantage that they can be processed at a low temperature, compared to the processing temperature of the thermoplastic polyurethane particles of Comparative Example 1.

Comparative Example 2: Manufacture of Thermoplastic Polyurethane Particles by Solvent Polymerization Method A prepolymer was synthesized by adding an ester or ether-based polyol to the dimethylformamide solvent and stirring it, and then adding diisocyanate. Subsequently, the thermoplastic polyurethane particles having a size of 400 μm were finally prepared by adding a diol or diamine-based chain extender which is a single molecule reactive at a temperature of 80° C.

Experimental Example 3: Analysis of Impurities in Particles

The impurity content of the particles prepared according to Example 1 and Comparative Example 2 was analyzed, and the results are shown in Table 3 below. Specifically, the residual solvent in the particles was measured using a GC/FID device (manufacturer: Agilent, model name: 7890A), and the heavy metals in the particles were measured using an ICP/MS device (manufacturer: Perkinelmer, model name: Nexion300). The impurity content of Table 3 described below is the sum of the content of the residual solvent and the content of the heavy metals in the particles.

TABLE 3

|  | Impurity content (ppm) |
| --- | --- |
| Example 1 | 3 |
| Comparative Example 2 | 53 |

According to Table 3, it was confirmed that in the case of the particles of Comparative Example 2, since the solvent is used in the manufacture of the particles, the content of impurities is significantly higher than the particles of Example 1 due to the residual solvent in the particles. In contrast, the particles of Example 1 contained little impurities such as residual solvent except for trace impurities coming from the device during the manufacture of the particles.

All simple modifications or variations of the present invention fall within the scope of the present invention, and the specific scope of protection of the present invention will be clarified by the appended claims.

EXPLANATION OF SYMBOLS d: Vertical distance of two parallel tangent planes
A: Area
10: Nozzle
20: Second air stream
30: Thermoplastic polyurethane resin stream
40: First air stream

The invention claimed is:

1. Thermoplastic polyurethane particles which are formed as a continuous matrix from a thermoplastic polyurethane resin and have a particle diameter of 200 to 500 μM, wherein an impurity content of the thermoplastic polyurethane particles is 50 ppm or less.

2. The thermoplastic polyurethane particles according to claim 1, wherein the thermoplastic polyurethane particles have a peak of cold crystallization temperature ($T_{cc}$) at a temperature between a glass transition temperature ($T_g$) and a melting point ($T_m$) in the differential scanning calorimetry (DSC) curve derived from temperature rise analysis of 10° C./min by the DSC.

3. The thermoplastic polyurethane particles according to claim 1, wherein the thermoplastic polyurethane particles have an aspect ratio of 1.00 or more and less than 1.05, calculated by Formula 1 below, and a roundness of 0.95 to 1.00, calculated by Formula 2 below:

Aspect ratio=major axis/minor axis, [Formula 1]

Roundness=4×area/(π×major axis^2). [Formula 2]

4. The thermoplastic polyurethane particles according to claim 1, wherein the thermoplastic polyurethane particles have a compression degree of 10 to 20%, calculated by Formula 3 below:

Compression degree=(compressed bulk density−relaxed bulk density)/compressed bulk density× 100. [Formula 3]

5. The thermoplastic polyurethane particles according to claim 4, wherein the thermoplastic polyurethane particles have a compressed bulk density of 0.45 to 0.5 g/cm$^3$.

6. The thermoplastic polyurethane particles according to claim 1, wherein the thermoplastic polyurethane particles have a flow time of 10 to 20 seconds.

* * * * *